(12) United States Patent
Contadini et al.

(10) Patent No.: US 6,219,960 B1
(45) Date of Patent: Apr. 24, 2001

(54) INSECT BAIT STATION

(75) Inventors: Carl D. Contadini, Terryville; Nicholas A. Velezis, Middlebury; John J. Dean, Oxford, all of CT (US)

(73) Assignee: Waterbury Companies, Inc., Waterbury, CT (US)

( * ) Notice: Subject to any disclaimer, the term of this patent is extended or adjusted under 35 U.S.C. 154(b) by 0 days.

(21) Appl. No.: 09/181,169

(22) Filed: Oct. 28, 1998

(51) Int. Cl.⁷ .................................................. A01M 1/10
(52) U.S. Cl. ............................ 43/121; 43/131; 43/132.1; 43/107
(58) Field of Search ................. 43/121, 131, 132.1, 43/107

(56) References Cited

U.S. PATENT DOCUMENTS

| | | | |
|---|---|---|---|
| 1,700,517 | * 1/1929 | Ross | 43/131 |
| 4,103,450 | * 8/1978 | Whitcomb | 43/131 |
| 4,194,690 | * 3/1980 | Stever | 239/57 |
| 4,208,829 | 6/1980 | Manning | 43/131 |
| 4,244,135 | * 1/1981 | Harwoods | 43/122 |
| 4,328,636 | * 5/1982 | Johnson | 43/107 |
| 4,485,582 | 12/1984 | Morris | 43/131 |
| 4,497,131 | 2/1985 | Hicks | 43/131 |
| 4,563,836 | 1/1986 | Woodruff et al. | 43/131 |
| 4,625,452 | 12/1986 | Knote | 43/131 |
| 4,642,936 | * 2/1987 | Jobin | 43/122 |
| 4,658,536 | 4/1987 | Baker | 43/131 |
| 4,761,912 | * 8/1988 | Dyer | 43/121 |
| 4,837,969 | 6/1989 | Demarest | 43/131 |
| 4,841,669 | 6/1989 | Demarest et al. | 43/131 |
| 4,894,947 | 1/1990 | Brandli | 43/131 |
| 5,033,229 | * 7/1991 | Cemarest | 43/131 |
| 5,152,097 | 10/1992 | Rhodes | 43/132.1 |
| 5,275,125 | 1/1994 | Rotramel | 119/15 |
| 5,357,709 | 10/1994 | Lin | 43/131 |
| 5,390,441 | * 2/1995 | Pence | 43/131 |
| 5,548,922 | 8/1996 | Wefler | 43/131 |
| 5,555,672 | * 9/1996 | Thorne | 43/124 |
| 5,557,880 | * 9/1996 | Schneidmiller | 43/122 |
| 5,575,992 | 11/1996 | Kunze | 424/76.4 |
| 5,737,870 | 4/1998 | Thind | 43/107 |
| 5,749,168 | * 5/1998 | Chrysanthis | 43/122 |

* cited by examiner

Primary Examiner—Jack W. Lavinder
(74) Attorney, Agent, or Firm—Carmody & Torrance LLP

(57) ABSTRACT

An insect bait station is disclosed which comprises a receptacle with an opening, the receptacle having a reservoir for an insect bait formulation; a cover with a plurality of gate openings sized to allow selective entry of insects; and a membrane with an opening providing access to an insect bait formulation. The membrane covers the receptacle with sufficient dimensional stability and structural integrity to substantially retain its position while an insect traverses its top surface. In a preferred embodiment, the insect bait station comprises a replaceable cartridge having a reservoir containing an insect bait formulation with a substrate covered by the membrane. Preferably, the membrane having the ability to retard evaporation of the bait formulation. The bait formulation may include an insect attractant and/or an insect poison material in solid, liquid or gel form.

10 Claims, 7 Drawing Sheets

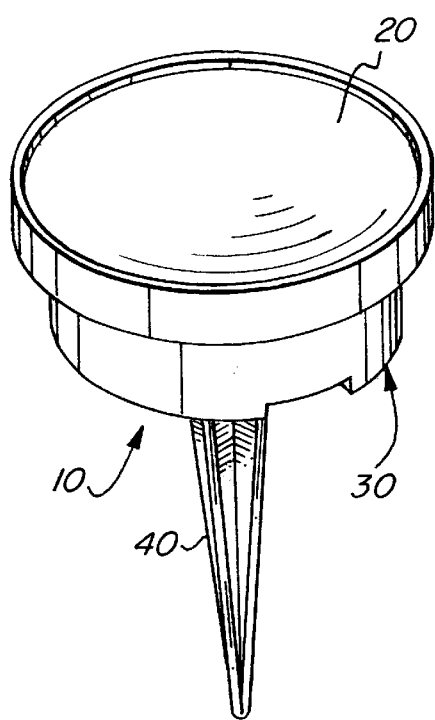
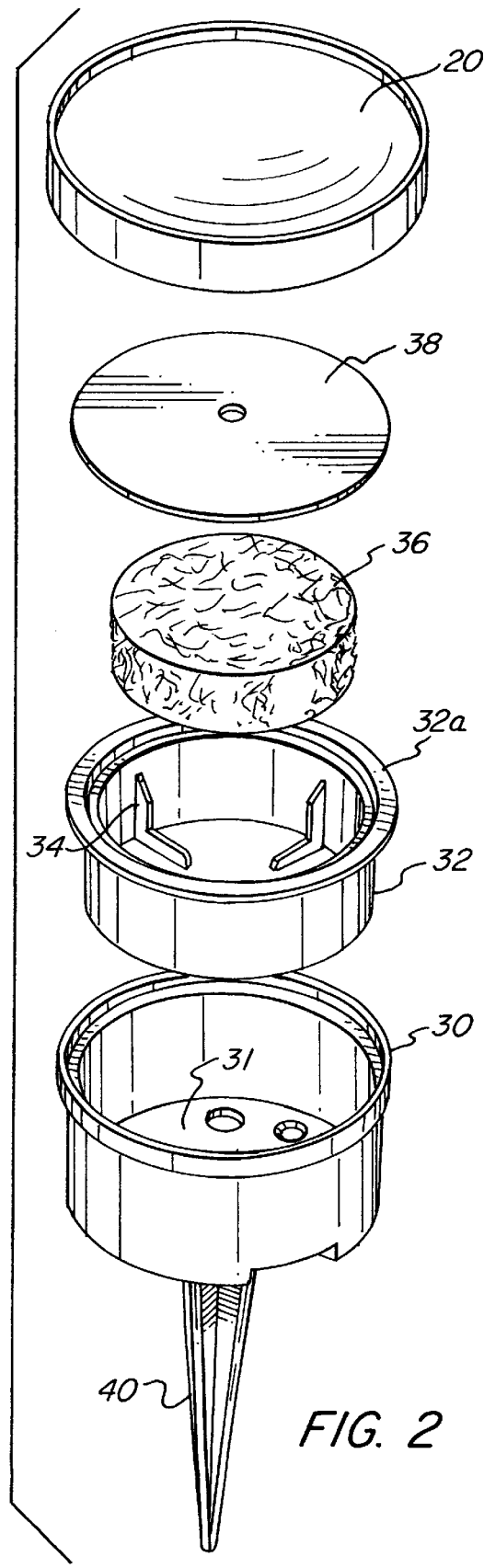
FIG. 1
FIG. 2

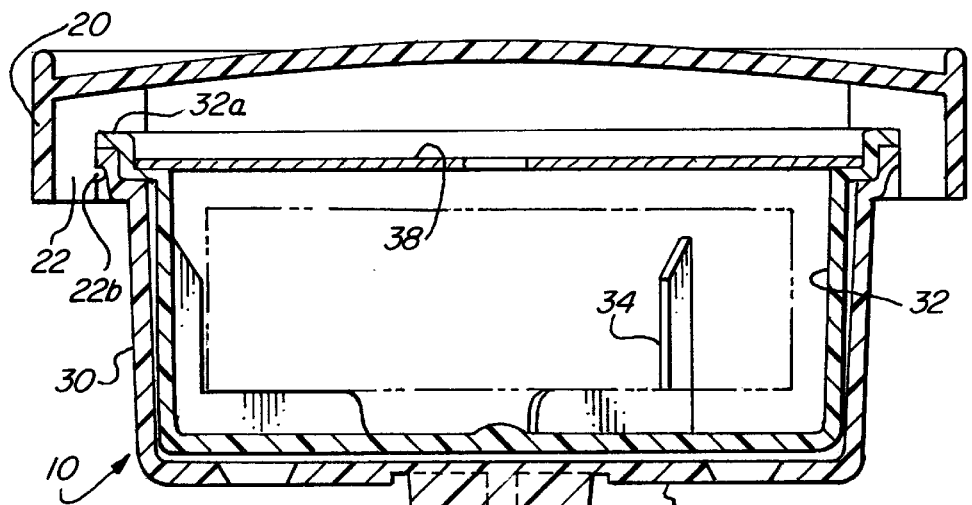
FIG. 3A
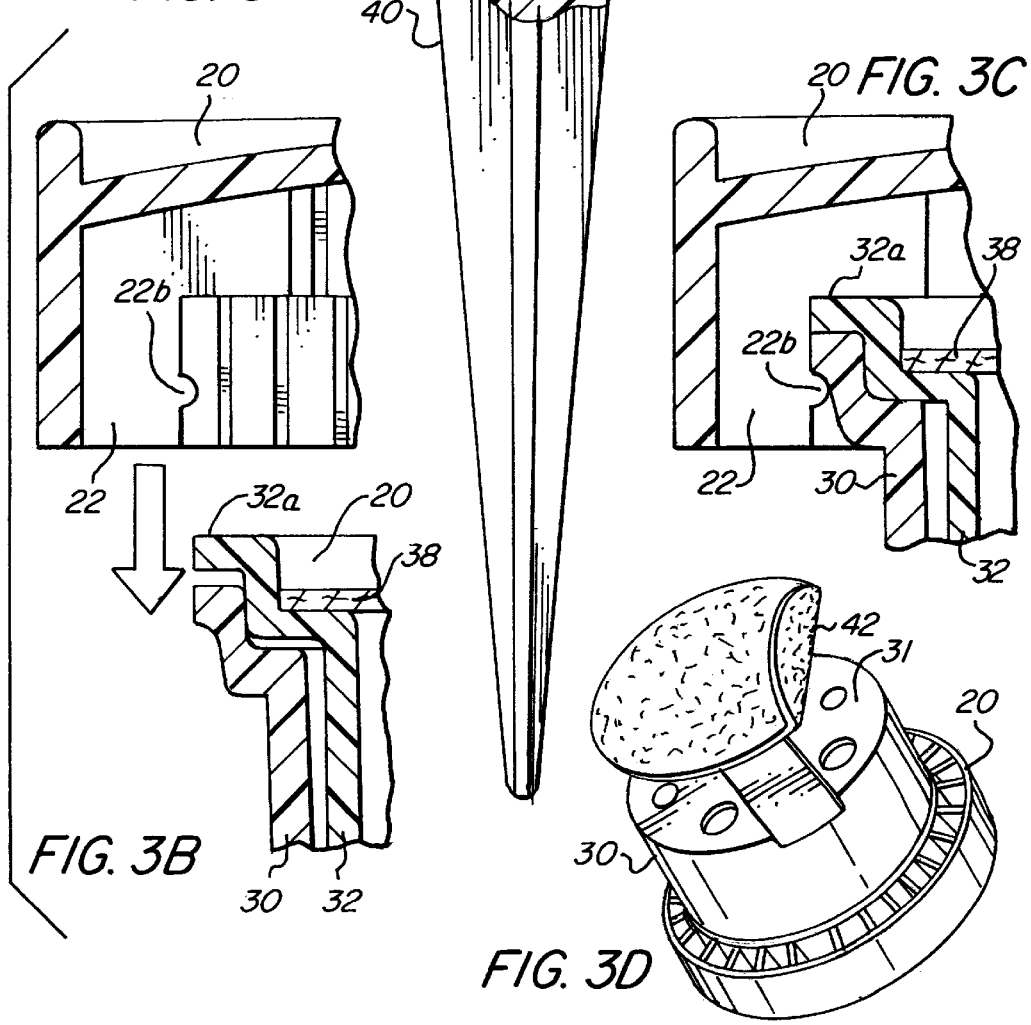
FIG. 3B
FIG. 3C
FIG. 3D

INSECT BAIT STATION

FIELD OF THE INVENTION

The present invention relates to a bait station for holding an insect bait formulation comprising an insect attractant and/or an insect poison material to destroy insects, particularly a poison for crawling insects. More specifically, the present invention is directed to a bait station adapted to selectively destroy insects while achieving improved bait life and easier bait replacement.

BACKGROUND OF THE INVENTION

Bait stations are well known and many devices for holding a bait formulation comprising an attractant with a poison to destroy pests, particularly crawling insects, have been disclosed. For example, U.S. Pat. No. 4,485,582 to Morris teaches the use of a feeding station administering a poison housed in a base with a permanently affixed cover. Access to the poison is controlled by three types of openings, one type being formed in the cover, the second type being formed in an extension mounted in the ground, and the third type being formed in a inner compartment.

U.S. Pat. No. 4,837,969 to Demarest discloses a bait station having a multi-lobed structure with ramps. Inner walls intersect a ramped structure forming guides to direct insects to a central well containing a bait. A cover is also permanently attached to a base where apertures allow access to the central well containing the bait.

U.S. Pat. No. 4,894,947 to Brandli discloses an insect feeding station having guide walls leading from openings on the periphery of the station to a central poison area. The guide walls function to guide the insect toward the poison and to prevent departure from the station before contact with the poison. The central poison area can have a contrasting or luminous color under the poison indicating when the poison is consumed.

U.S. Pat. No. 5,033,229 to Demarest et al. teaches a bait station comprising a ramped base with a funneled reservoir for holding a liquid bait-toxicant formulation. The liquid in the reservoir is released onto an absorbent pad in a central well where insects contact through access openings formed in the ramped base.

U.S. Pat. No. 5,548,922 to Wefler discloses another bait station using a liquid insect bait. The bait station includes a hollow body having a base and a ramped cover sealed to the base in a liquid tight fashion. The base has a floor housing a porous disk which functions to transport a liquid insect bait absorbed onto the disk through capillary action to a central stage formed from the ramped cover. Portals in the ramped cover are of a size to at least allow feeding structures of targeted insects access to liquid on the disk beyond the central stage.

Generally similar bait stations are disclosed in U.S. Pat. No. 4,208,829 to Manning; U.S. Pat. No. 4,497,131 to Hicks; U.S. Pat. No. 4,563,836 to Woodruff et al.; U.S. Pat. No. 4,625,452 to Knote; U.S. Pat. No. 4,658,536 to Baker; U.S. Pat. No. 4,841,669 to Demarest et al.; U.S. Pat. No. 5,152,097 to Rhodes; U.S. Pat. No. 5,357,709 to Lin; and U.S. Pat. No. 5,737,870 to Thind.

One disadvantage to the prior art bait stations is their complexity of design and higher manufacturing costs associated with forming intricate baffles and internal compartments to guide the insect and separate the bait from outside tampering. In addition, past bait stations were designed for selective entry that sought to prevent children from entering and contacting the poison than selective entry between various types of insects. Therefore, beneficial insects to an ecosystem not intended to be targeted were often destroyed with the targeted pests. Moreover, the design of past bait stations did not allow for the selection of the type of insects to be targeted for destruction to be readily changed either by the manufacturer, or by the end user. In addition, due to the complexity of most designs, the insect entry openings to the bait were often limited, thereby reducing the efficacy of the bait station.

Another disadvantage to the prior art bait stations is typically that the bait and poison are permanently fixed in the bait station. Therefore when the bait is exhausted the station is rendered useless and cannot be replenished. Another disadvantage is that once the type of bait is chosen for the station, it often cannot be changed to suit changing insect populations or a change in the environment the station is desired to function in. In addition, past designs of bait stations, particularly those employing liquid baits, typically do not allow ready access to the bait to check the level and/or integrity of the bait. Yet another disadvantage, particularly with liquid baits, is the rate of evaporation or the fact that contact of the bait with the surrounding air and environment are not controlled. Therefore, the effectiveness and amount of bait in the station can be compromised from environmental factors such as heat, sunlight, wind, rain and moisture, or any other factor that will affect the bait.

What is desired, therefore, is a bait station with an economical design, and a plurality of openings that selectively guide targeted insects to a poisonous bait, along with the ability to readily change the bait employed and control the evaporation and effectiveness of the bait within the station.

SUMMARY OF THE INVENTION

Accordingly, it is an object of the present invention to provide an insect bait station that attracts and allows entry of selected insects.

It is another object of the present invention to provide an insect bait station which provides the ability to readily change the targeted pests, either by the manufacturer and end user of the bait station.

It is a further object of the present invention to provide an insect bait station that allows the bait formulation to be readily changed by either the manufacturer or end user of the bait station.

It is yet a further object of the present invention to provide an insect bait station where the integrity and amount of the bait formulation can be more readily checked by the end user than conventional insect bait stations.

It is yet another object of the present invention to provide an insect bait station which allows the rate of evaporation and contact of a bait formulation to be controlled, thereby improving bait life and effectiveness.

To overcome the deficiencies of the prior art and to achieve the objects and advantages listed above, an improved insect bait station is disclosed. The insect bait station of the present invention comprises a receptacle with an opening having a reservoir for an insect bait; a cover with a plurality of gate openings sized to allow selective entry of insects; and a membrane disposed over the reservoir with an opening providing access to the insect bait formulation. The membrane has a top surface covering the receptacle with sufficient dimensional stability and structural integrity to substantially retain its position while an insect traverses it. The membrane also has a density and air permeability sufficient to retard evaporation of the insect bait formulation.

The inventive insect bait station can also comprise a substrate for the insect bait formulation. The substrate is preferably of a mesh material capable of supporting the weight of insects entering the reservoir through the opening of the membrane (the substrate can also act as a support to assist in maintaining the membrane in position). Preferably, the insect bait station of the present invention further comprises an insect bait formulation having a attractant material and a poison, wherein either the attractant or poison, or both, can be in a liquid, solid, or gel form.

Advantageously, the insect trap of the present invention comprises a replaceable cartridge having an opening that functions as the reservoir for the insect bait formulation. The insect bait station also preferably further comprises a housing that is capable of being affixed to the ground or to a surface of a structure.

The invention and its particular features and advantages will become more apparent from the following detailed description when considered with reference to the accompanying drawings.

BRIEF DESCRIPTION OF THE DRAWINGS

FIG. 1 is a front perspective view of an insect bait station constructed in accordance with the present invention.

FIG. 2 is an exploded front perspective view of the insect bait station shown in FIG. 1.

FIG. 3A is a cross-sectional view taken along the centerline of the insect bait station shown in FIG. 1;

FIG. 3B is a side cross-sectional detail view of the insect bait station shown in FIG. 3A, further showing the alignment of the cover before it is snapped on to the edges of the housing and cartridge, where the cartridge sits within the housing.

FIG. 3C is a side cross-sectional detail view of the insect bait station shown in FIG. 3B after the cover is snapped on to the edges of the housing and cartridge, where the cartridge sits within the housing.

FIG. 3D is a rear perspective view of an insect bait station constructed in accordance with the present invention where an adhesive pad is shown exploded and folded away from the bottom of the bait station.

DETAILED DESCRIPTION OF THE DRAWINGS

Figure 5:
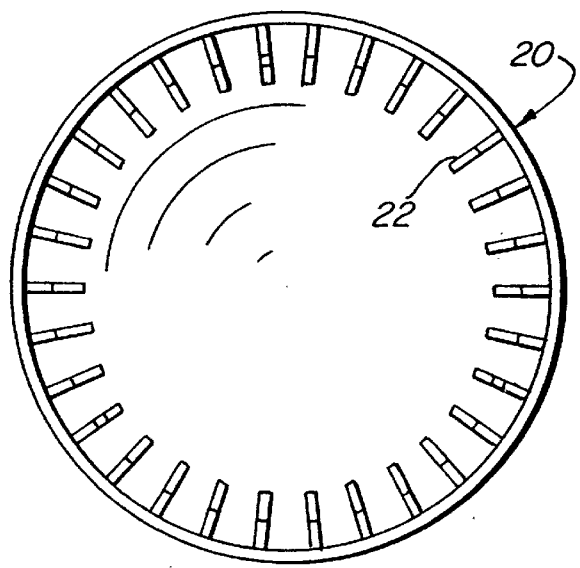
FIG. 5 is bottom view of the cover of the insect trap with a cut away perspective detail of the insect bait station openings.

Referring to the drawings in detail, an insect bait station is shown and generally designated by the reference numeral 10. It should be noted that for the sake of clarity all the components and parts of insect bait station 10 may not be shown and/or marked in all the drawings. As used in this description, the terms "up", "down", "top", "bottom", etc. refer to insect bait station 10 when in the orientation illustrated in FIG. 1, although it will be understood that insect bait station 10 can be utilized in a variety of orientations.

Referring to FIGS. 1 and 2, insect bait station 10 comprises a removable cover 20, a membrane 38, and a receptacle or housing 30 to which a stake 40, or other means to affix housing 30 to the ground or a surface can be attached. Bait station 10 can assume any particular shape such as round or rectangular, and can be formed of any material having the desired structural integrity and dimensional stability required of the unit. Cover 20 and housing 30 with stake 40 can be formed of any suitable material, such as dimensionally stable plastics, metals, etc. Most preferably, cover 20 and housing 30 together with stake 40 are formed of a dimensionally stable plastic material, such as 20% calcium carbonate polypropylene. As shown in FIG. 5, cover 20 further comprises a plurality of gate openings formed by gates 22. Gates 22 are preferably "L" shaped, having two edges oriented 90 degrees apart, spaced equidistant from each other, and positioned circumferentially on the edge of cover 20, where cover 20 is circular in shape. One of the edges to gate 22 is perpendicular to a flat circumferential edge or lip to cover 20. The other edge to gate 22 is perpendicular to the bottom surface of cover 20. As a result, gates 22 form openings through the lip to cover 20 providing access to insects attracted to the bait station 10.

One advantage to the present invention is that the type of insects targeted for destruction can be precisely selected, where entry of larger, perhaps more beneficial insects can be prevented by selection of the appropriate spacing of gates 22 that would prevent entry of larger non-targeted insects. Consequently, the bait formulation in the bait station is only consumed by the targeted insects and not wasted on larger non-targeted insects, thereby improving the efficacy of bait station 10.

Another advantage is that because gates 22 can be positioned around the entire edge of cover 20, the number of openings for insect entry into the bait station 10 can be maximized, thereby also improving the efficacy of the bait station 10.

Another advantage to the configuration of gates 22 with a removable cover 20 is that the selective entry between insects to bait station 10 can be readily changed by simply replacing cover 20 with another cover having gates 22 spaced at a different interval. This can be done during manufacturing and assembly of bait station 10, thereby allowing different bait stations to be produced with little change to the overall process. This allows for simpler implementation of product changes, increased production efficiency, greater product variety, and fewer product flaws with decreased overall manufacturing costs.

Yet another advantage of the present invention is selection of the type of insects to be targeted for destruction can be readily changed by the end user of the bait station 10 simply by replacing cover 20 with another cover having gates 22 spaced at a different interval. This allows the end user to change the type of insects destroyed by bait station 10 without having to purchase a whole new bait station.

Yet a further advantage to cover 20 and gates 22 is provided by another embodiment of the present invention wherein the spacing between gates 22 are not all equidistant, but are varied or staggered to provide selective entry of more than one targeted insect pest. For example, it may be desired to target two types of insects, where one insect is larger than the other, but where the goal is to control the population of the larger targeted insect, yet exterminate the smaller targeted insect. The present invention, with alternate spacing of gates 22, allows bait station 10 to target larger insects yet limit their entry due to the presence of many other smaller spacings between gates 22. In this way, larger targeted insects can be controlled to a lesser extent than smaller insect targets which can better achieve the goal of controlling different insect populations to a desired ratio. As shown in FIG. 5 gates 22 preferably further comprise means for catching receptacle or housing 30 within cover 20 such as rounded catch 22b.

Referring to FIG. 3A, one embodiment of the present invention shows a cross-section of bait station 10, further comprising a replaceable cartridge 32 housed within housing 30. The cartridge 32 forms an opening or reservoir for containing an insect bait formulation. Preferably, cartridge 32 contains membrane 38 covering the opening or reservoir of cartridge 32, wherein cartridge 32 further comprises a lipped flange 32a circumferentially surrounding the edge of cartridge 32, wherein cartridge 32 has a cylindrical form with a bottom surface 31 and three "L" shaped ribs 34 positioned 120 degrees apart as further depicted in FIG. 6. Preferably, cartridge 32 will contain prepared bait formulation as part of the unit. Cartridge 32 can be formed of any suitable material, such as dimensionally stable plastics, metals, etc.

Figure 4:
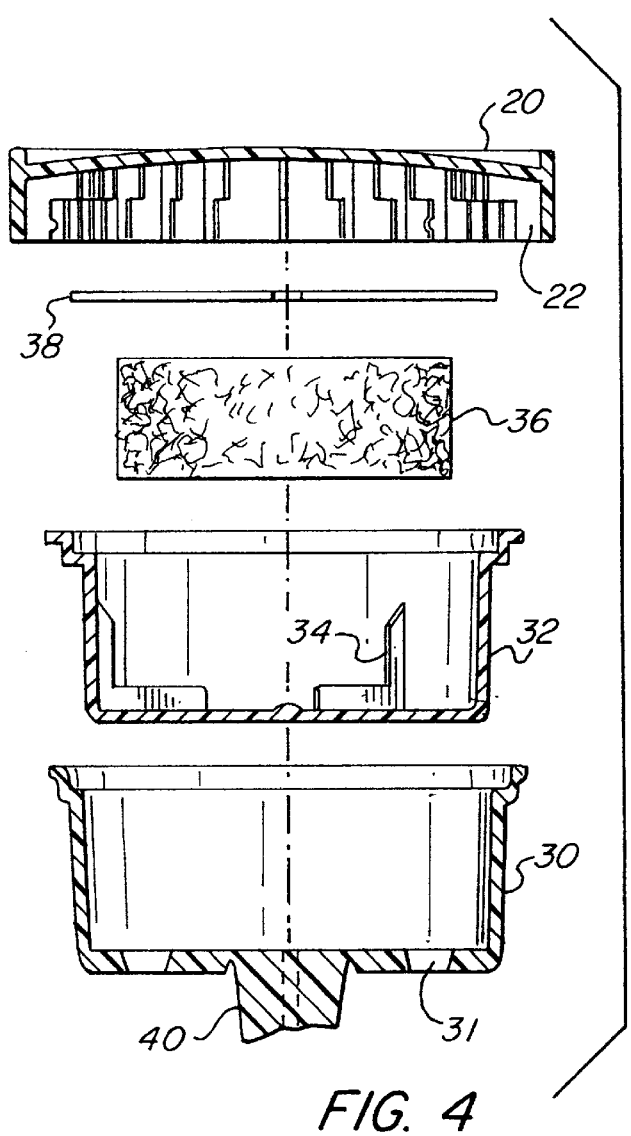
FIG. 4 is an exploded cross-sectional view taken along the centerline of the insect bait station as shown in FIG. 3A.

Referring to FIG. 3B, one embodiment of the present invention shows a cross-section of bait station 10, comprising cartridge 32 housed within housing 30 before being snapped into the cover 20 by catch 22b, also shown in FIG. 5. Preferably, cover 20 has at least one or preferably three or greater of catch 22b, each of which is spaced 120 degrees apart from the other. As shown in FIG. 3C, catch 22b is designed to hold an edge of housing 30, with the flange 32a of cartridge 32 housed within housing 30, against the edge of gate 22, thereby holding housing 30 and cartridge 32 within cover 20. As shown in FIGS. 2, 3A, and 4, ribs 34 function to provide spacers to keep a substrate 36 above the bottom surface and away from the walls of cartridge 32. Ribs 34 provide the advantage of allowing targeted insects to crawl around and under substrate 36 while the insects have entered bait station 10 to better access the bait formulation stored in the reservoir formed by cartridge 32.

In a preferred embodiment, substrate 36 comprises a mesh material capable of supporting the weight of insects entering the reservoir through an opening in membrane 38. The substrate 36 functions to provide a substrate for the insect bait formulation. The substrate can also act as a support to assist in maintaining the membrane in position. The mesh material may be made of any dimensionally stable plastics, metals, etc. for the application. The mesh material for substrate 36 has a pore density expressed in pores per inch (ppi), which can be varied to suit the particular pest targeted for destruction by the bait station. For example, substrate 36 having a density of 3–5 ppi would be suitable for destroying carpenter ants. It is understood that substrate 36 is not limited to any particular pore density and can be changed to suit the end users requirements.

FIG. 3D shows an alternative embodiment of the present invention of bait station 10, wherein an adhesive pad 42 is affixed to the bottom surface 31 of housing 30 to allow mounting to a suitable surface. A suitable mounting surface for housing 30 (and therefore insect bait station 10) can be any surface to which the insect bait station 10 is desired to be mounted, such as a wall, door, ceiling, etc., provided the bait formulation is in a state that allows the desired mounting orientation. It is understood that the mounting means of bottom surface 31 is not limited to adhesive pad 42 but may be through the agency of, for instance, screws, anchors, etc., wherein housing 30 is mounted, either directly or indirectly to a suitable mounting surface.

According to the present invention, membrane 38 functions to limit the evaporation and exposure of a bait formulation comprising an insect attractant capable of attracting insects to the bait station 10 and/or an insect poison material to destroy insects, wherein the bait formulation resides in housing 30, or preferably, the reservoir of cartridge 32. The properties of the membrane 38 have the ability to retard the evaporation of the bait formulation.

Any membrane can be used which permits the insect bait formulation to communicate with an environment external to the opening of cartridge 32. Membrane 38 is made preferably of a polyester material or any other material that retards evaporation of the bait formulation.

The membrane 38 can be of any thickness preferably 1 to 35 mils in thickness. The membrane should be secured to top surface of housing 30 or the opening of cartridge 32 so that evaporation of the insect bait formulation occurs from the top surface of membrane 38 rather than from the sides or bottom surface of the membrane 38.

A covering material or seal can be provided across the top of housing 30 or cartridge 32. If the latter, then the seal is joined to flange 32a, that is impermeable to the insect bait formulation and prevents the release of the insect bait formulation contained therein between the time of manufacture and the time of use. Such a seal is preferably made of foil, and is securely bonded to top of housing 30 or to flange 32a by heat and pressure bonding. Alternatively, ultrasonic welding or a suitable adhesive may be used to make this bond. A tab may be provided to the seal that can be gripped by the end user to remove the seal when the bait station is to be activated in the environment it is placed.

It is preferred that the bait formulation comprise an insect poison material of a slow-kill or delayed action nature of the sort well known in the art, so that the feeding insect may leave the insect bait station and return to its nest or hive to redistribute the poisoned bait to kill other insects that have not entered the bait station. Examples of delayed action bait formulations that include insect attractants and a poison material are disclosed as, but not limited to, an aqueous solution in U.S. Pat. No. 5,033,229 to Demarest et al., or a solid material such as disclosed in U.S. Pat. No. 4,485,582 to Morris, or any of the formulations of the like disclosed in U.S. Pat. No. 4,841,669 to Demarest et al., or any other preferred bait formulations. The preceding patents are hereby incorporated by reference. Alternatively, the bait formulation may be carried in a gel form in the cartridge 32. The gel can be either a hot-type or a cold-type gel formulation. The composition of the gel varies depending upon the desired insect poison and attractant material, the desired release rate and concentration, and the retardation of membrane 38 which covers the reservoir of cartridge 32. The hot-type gelling agent is any heat-activated agent which sufficiently solidifies, thickens, hardens or otherwise firms the gel such that it does not seep or otherwise exit through any attached membrane 38 during use or shipping. The cold-type gelling agent is any agent which sufficiently solidifies, thickens, hardens or otherwise firms the gel composition, with or without the application of heat such that it does not seep or otherwise exit through any attached membrane 38 during use or shipping. Specific gelling agents, solvents and encapsulants that may be used include, but are not limited to, those disclosed in U.S. Pat. No. 5,575,992 to Kunze, which is hereby incorporated by reference. It is understood that the present invention is not limited to any particular insecticide or poison material, or any particular insect attractant, or any particular bait formulation of an insect attractant and an insect poison. For instance, a pheromone or combination of pheromones can be used to draw insects to bait station 10. Another insect attractant which can be employed is a scent, such as the scent of a food like peanut butter, which will draw insects to bait station 10.

FIGS. 7–12 show alternative embodiments of the present invention of the bait station 10, wherein clips 50, 51, or 52 function to secure cover 20 to housing 30 through the action of holding forces exerted by tension created in the form and position of the material forming the clip and the clips contact with cover 20 and housing 30. Preferably, the clip is constructed of a material, such as a metal or plastic, that allows holding forces to be created by bending and forming the material in shapes as shown in FIGS. 7–12 but is not limited to those particular shapes or configurations.

Figure 7:
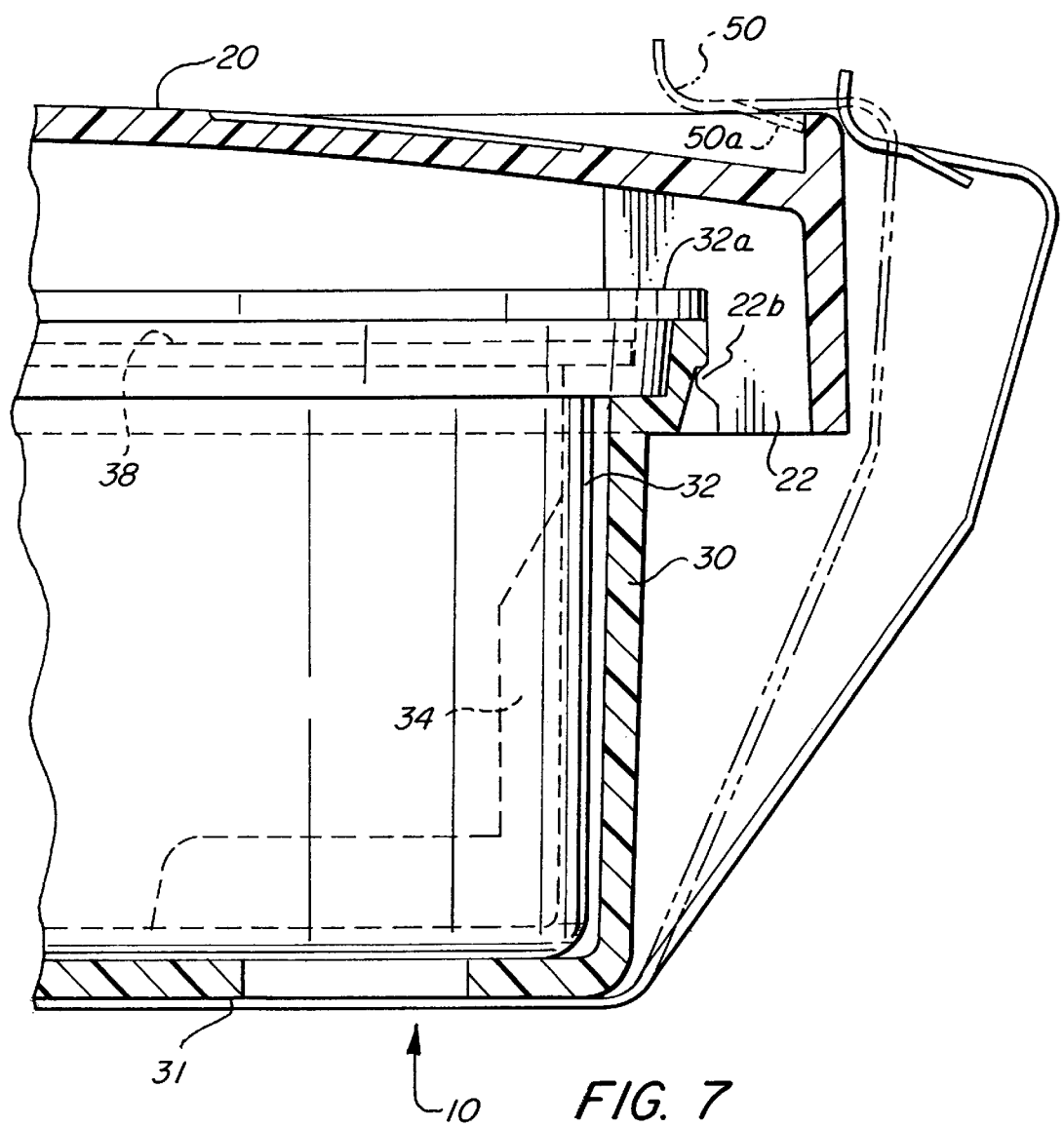
FIG. 7 is a side cross-sectional detail view of the insect bait station shown in FIG. 3A, further showing the addition of a clip in a snap position, and alternative form position, securing the cover to the housing.
Figure 8:
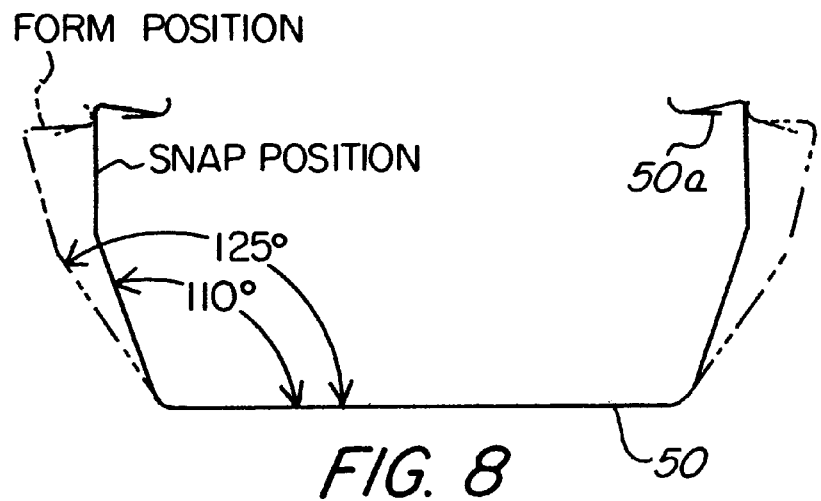
FIG. 8 is a schematic cross-sectional view of the clip shown in FIG. 7.
Figure 9:
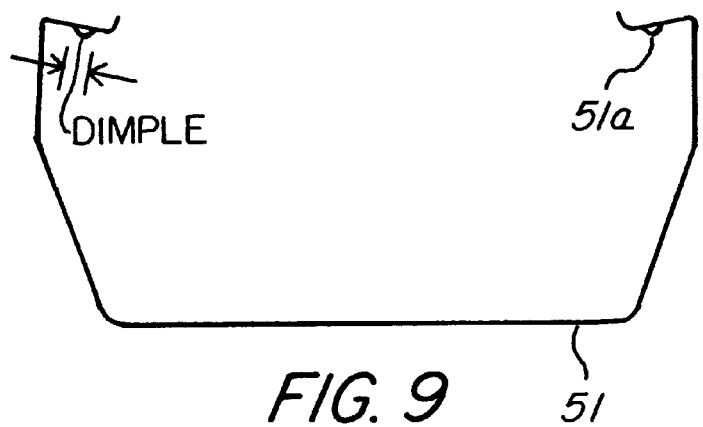
FIGS. 9 and 9A show a schematic cross-sectional view of a clip, and a top view of a clip, respectively. The clip is shown to have a dimple on each edge.
Figure 9A:
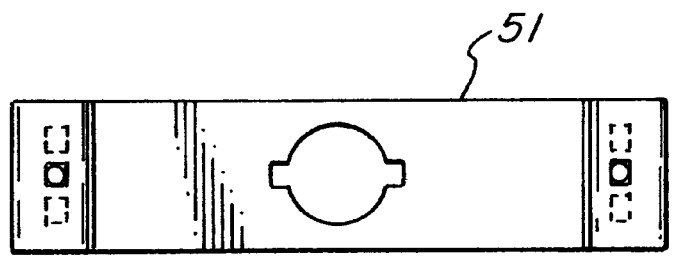
Figure 10A:
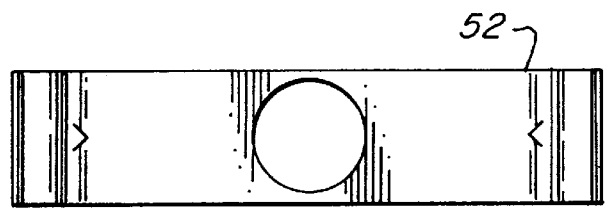
FIGS. 10 and 10A show a schematic cross-sectional view of a clip, and a top view of a clip, respectively. The clip is shown to have two crimped sections.
Figure 10:
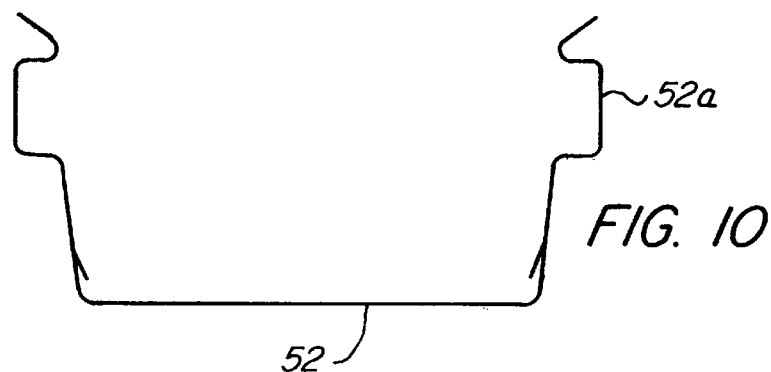
Figure 11A:
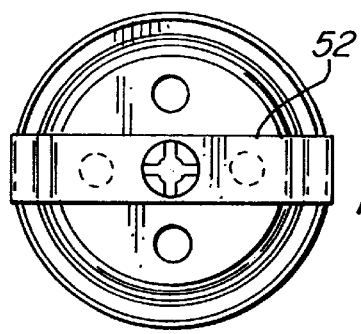
FIGS. 11 and 11A show a partial cross-sectional view, and a bottom view of the insect bait station with the clip shown in FIG. 10, respectively.
Figure 11:
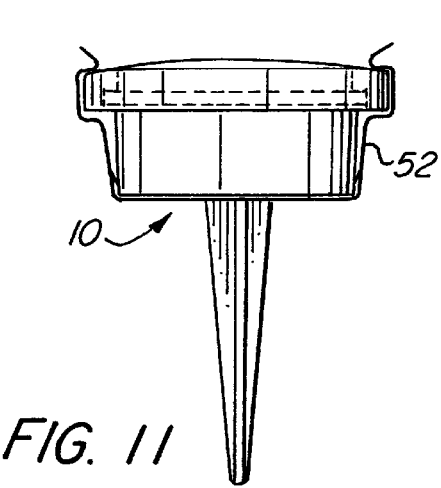
Figure 12:
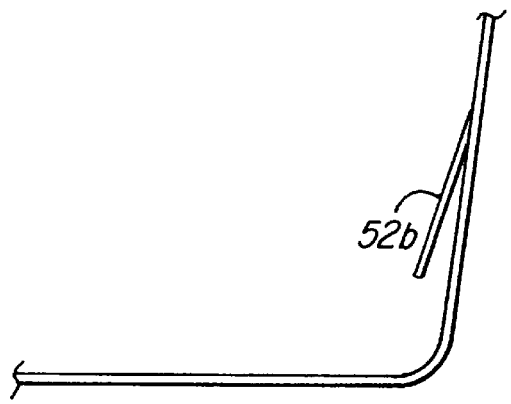
FIG. 12 shows a detail cross-sectional view of the clip within detail A of FIG. 11.

For example, FIG. 7 shows a clip 50 with a skeg 50a, wherein skeg 50a functions to create a force against cover 20 that requires clip 50 to be lifted up and away from cover 20 for removal, thereby making removal of cover 20 more difficult, particularly for small children. FIG. 9 shows a clip 51 with a dimple 51a that functions to create a downward force against cover 20 also making removal of cover 20 more difficult. FIG. 10 shows a clip 52 with crimped sections 52a that function to create a sideward force in against cover 20 also making removal of cover 20 more difficult. FIG. 12 shows tongue 52b that functions to create a sideward force against housing 30, making tampering with bait station 10 more difficult.

In operation, insect bait station 10 is mounted in the earth via stake 40, or on a mounting surface which can comprise a wall, ceiling, door or the like via a mounting means, such as adhesive pad 42. Preferably, a bait formulation is contained in a reservoir of a replaceable cartridge 32. The bait formulation comprises an insect attractant formulated with a poison material that is of a slow-kill or delayed action nature as described. The end user activates the bait formulation by lifting a replaceable cover 20 from cartridge 32 and removing a seal provided across the top of cartridge 32, joined to flange 32a of cartridge 32. The cover 20 is then replaced over cartridge 32, wherein cartridge 32 is housed in housing 30. In a preferred embodiment, a clip is placed over cover 20 securing it to housing 30. The clip can be removable or permanently attached to housing 30 to minimize or prevent tampering with bait station 10. Once insects are drawn to bait station 10, insects of only a size targeted for entry between gates 22 of cover 20 can enter the bait station. Once the targeted insects enter the bait station 10, they must traverse membrane 38 and are further drawn to enter the reservoir of cartridge 32 that houses the bait formulation through an opening provided in membrane 38. The insects then contact the bait formulation with the poison material and exit the reservoir of cartridge 32 back through the opening of membrane 38, eventually leaving bait station 10 through gates 22.

Once a sufficient number of insects have exhausted the bait formulation housed in the bait station 10, cartridge 32 can be replaced with a fresh supply of the bait formulation by another cartridge. To that end, therefore, the bait station can remain effective indefinitely. It should be noted that bait station 10 has been described for use with crawling insects for the sake of convenience only. Other pests may be destroyed in the same manner.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. An insect bait station comprising:
   a receptacle, the receptacle having an outer wall forming an opening therein, and a region therein to receive an insect bait formulation;
   a cover, removably securable to the receptacle, the cover having an outer surface and an inner surface, and a plurality of gates forming gate openings sized to allow selective entry of insects, wherein the plurality of gates are positioned on the inside surface of the cover and beyond the outer wall of the receptacle;
   a membrane, disposed intermediate the region formed to receive an insect bait formulation and the cover when the cover is positioned on the receptacle, the membrane including at least one opening for access to the insect bait formulation, said membrane having sufficient dimensional stability and structural integrity to permit an insect to traverse a top surface thereof;
   wherein access to the insect bait formulation is achieved by entering between the plurality of gates between the outer wall of the receptacle and the inner surface of the cover.

2. The insect bait station as claimed in claim 1, wherein the cover is removably securable to the receptacle.

3. The insect bait station as claimed in claim 1, wherein the cover is dimensioned such that the station receives an insect entering between the outer wall of the receptacle and the inner surface of the cover in a direction at least essentially parallel to the surface of the outer wall of the receptacle.

4. The insect station as claimed in claim 1, wherein at least one of the plurality of gates is "L" shaped and includes two edges, at least one of the edges lying essentially perpendicular with a lip of the cover.

5. The insect station as claimed in claim 1, wherein the outer surface of the cover is impermeable, such that access to the insect bait formulation must be by access to the inner surface of the cover through the gate openings.

6. The insect station as claimed in claim 1, wherein the receptacle is circular and has a first radius and the cover is circular and has a second radius greater than the first radius such that the cover overlays the receptacle; and
   wherein the plurality of gates are positioned on the inside surface of the cover beyond the first radius.

7. The insect bait station as claimed in claim 1, wherein the plurality of gates are integrally molded to the inner surface of the cover.

8. The insect bait station as claimed in claim 1, wherein the spacing between the plurality of gates is equidistant.

9. The insect bait station as claimed in claim 1, wherein the spacing between the plurality of gates is varied so as to permit entry into the receptacle by insects of at least two sizes.

10. An insect bait station system, the system comprising:

a receptacle, the receptacle having an outer wall forming an opening therein, and a region therein to receive an insect bait formulation;

at least two covers, each covering removably securable to the receptacle, each of the covers having an outer surface and an inner surface, and a plurality of gates forming gate openings sized to allow selective entry of insects, wherein the plurality of gates of the first cover are spaced apart by a first distance and the plurality of gates of the second cover are spaced apart by a second distance different from the first distance;

a membrane, disposed intermediate the region formed to receive an insect bait formulation and the cover when the cover is positioned on the receptacle, the membrane including at least one opening for access to the insect bait formulation, said membrane having sufficient dimensional stability and structural integrity to permit an insect to traverse a top surface thereof;

wherein access to the insect bait formulation is achieved by entering between the plurality of gates between the outer wall of the receptacle and the inner surface of the cover;

whereby the spacing between the plurality of gates in the first cover are dimensioned to permit access to the insect bait formulation by an insect of a first size and the spacing between the plurality of the gates in the second cover are dimensioned to permit access to the insect bait formulation by an insect of a second size.

* * * * *

UNITED STATES PATENT AND TRADEMARK OFFICE
CERTIFICATE OF CORRECTION

PATENT NO. : 6,219,960 B1  Page 1 of 1
DATED : April 24, 2001
INVENTOR(S) : Carl D. Contadini et al.

Figure 5A:
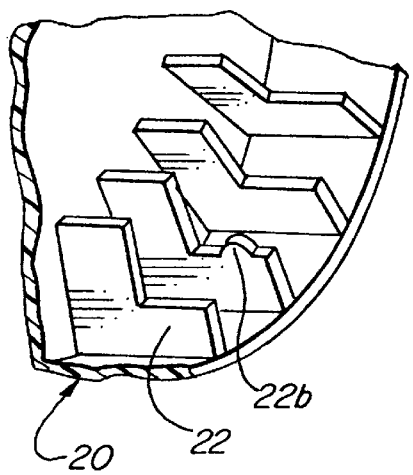
Figure 6:
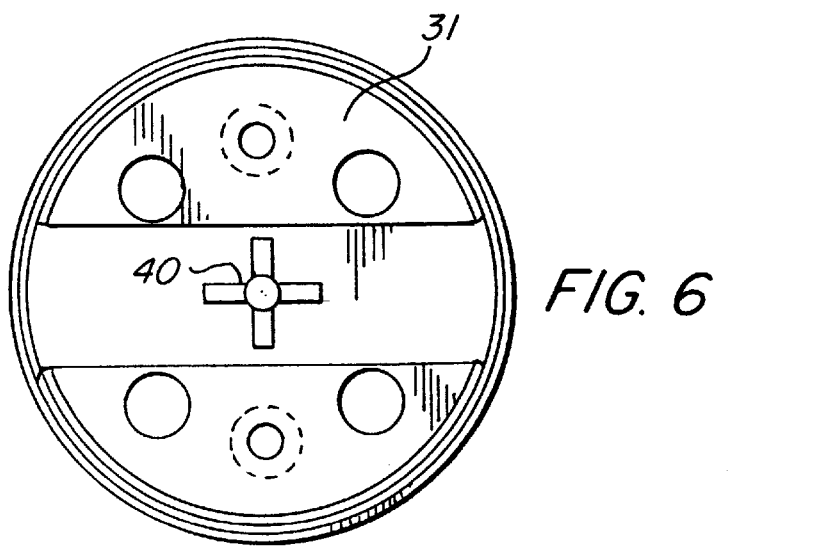
FIG. 6 is a top and bottom view of the housing of the insect bait station and a top view of the cartridge that fits into the housing.
Figure 6A:
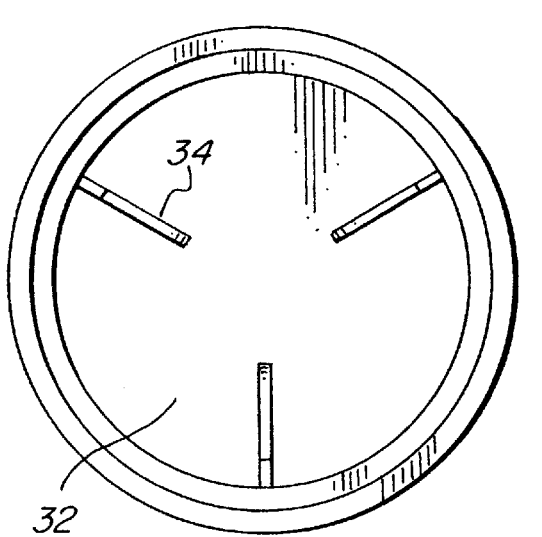
Figure 6B:
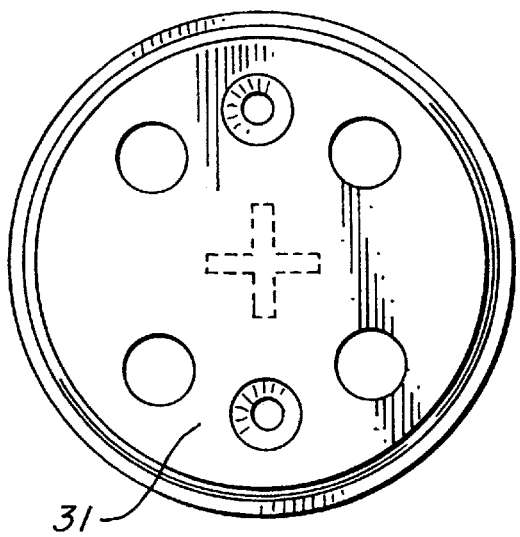

It is certified that error appears in the above-identified patent and that said Letters Patent is hereby corrected as shown below:

Column 3,
Line 46, delete "FIG. 5 is a bottom view" and insert -- FIGS. 5 and 5A are bottom views --;
Line 49, delete "FIG. 6 is a" and insert -- FIGS. 6 and 6A are respective -- and change "view" to -- views --;
Line 50, between "station and" and "a top view" insert -- FIG. 6B is --;

Column 4,
Line 27, delete "FIG. 5" and insert -- FIGS. 5 and 5A --;

Column 5,
Line 19, delete "FIG. 5" and insert -- FIG. 5A --;
Line 31, delete "FIG. 6" and insert -- FIG. 6A --; and
Lines 39 and 40, delete "FIG. 5" and insert -- FIG. 5A --.

Signed and Sealed this

Eighteenth Day of December, 2001

Attest:

*Attesting Officer*

JAMES E. ROGAN
*Director of the United States Patent and Trademark Office*